(12) United States Patent
Greene

(10) Patent No.: US 6,648,174 B2
(45) Date of Patent: Nov. 18, 2003

(54) TREATED WATER DISPENSING SYSTEM

(76) Inventor: Ralph G. Greene, P.O. Box 2766, Dalton, GA (US) 30720

( * ) Notice: Subject to any disclaimer, the term of this patent is extended or adjusted under 35 U.S.C. 154(b) by 78 days.

(21) Appl. No.: 10/000,874

(22) Filed: Nov. 28, 2001

(65) Prior Publication Data

US 2003/0132250 A1 Jul. 17, 2003

(51) Int. Cl.$^7$ ................................................ B67D 5/62
(52) U.S. Cl. .................... 222/66; 222/146.6; 222/185.1; 222/190
(58) Field of Search ........................... 222/64, 67, 638, 222/146.6, 185, 190, 482

(56) References Cited

U.S. PATENT DOCUMENTS

| | | | | |
|---|---|---|---|---|
| 4,923,091 A | * | 5/1990 | Sutera | 222/67 |
| 4,958,747 A | * | 9/1990 | Sheets | 222/67 |
| 5,111,966 A | * | 5/1992 | Fridman | 222/1 |
| 6,090,281 A | * | 7/2000 | Buckner | 210/205 |
| 6,139,726 A | * | 10/2000 | Greene | 210/94 |

* cited by examiner

*Primary Examiner*—Joseph A. Kaufman
(74) *Attorney, Agent, or Firm*—Alan Ruderman; Stephen J. Stark

(57) ABSTRACT

A water treatment tank for use with water purification apparatus including an ultra-violet lamp within a bulb onto which incoming water is directed to provide a thin laminar flow about the bulb. The tank may have two compartments, one above the other, formed by a separating baffle. The lower compartment has cooling coils about the walls for cooling the water therein relative to the water in the upper compartment. The ultraviolet lamp and a bulb extends through both compartments and the baffle to purify the water. A controller operates a switch to turn the normally off UV lamp on before opening a fill valve to replenish water in the tank. The lamp is turned off after a first run time. The water level is sensed by a low and high level limit which allow for a volume of water in the tank which may be utilized without necessitating operation of the lamp upon each dispensing of water from the tank. If water is not sensed increasing during filling, the controller may shut the fill valve and turn off the lamp, wait a period of time, and try again. The run time of the lamp may be increased with lamp age and the lamp may be cycled on for run times during periods of non-use.

22 Claims, 2 Drawing Sheets

TREATED WATER DISPENSING SYSTEM

BACKGROUND OF THE INVENTION

Water purification devices which purify at slow rate, such as those which use the distillation and the reverse-osmosis processes, deliver water into a storage tank or reservoir from which the water is dispensed. The same is true in regard to systems which use bottled water and water filter dispensing coolers. The water, however, may be easily contaminated with bacteria by contact with air on the storage and dispensing mechanisms, or merely by sitting stagnant in the reservoir. This is particularly true with bottled water cooler dispensers and those units that are used as replacements for bottled water cooler dispensers since the tanks are non-pressurized, and therefore must be vented to permit water to be dispensed by gravity flow.

A known method for eliminating bacterial contamination is the use of ultra-violet ("UV") light. The light energy from a UV lamp is germicidal, because UV light penetrates microbial organism's protective membrane layer and photochemically damages the DNA structure, disabling its self-reproducing capability and rendering the cell lifeless.

UV light is in the region of the electromagnetic spectrum that lies between visible light and X-rays. The ultra-violet spectrum ranges from 100 nm to 400 nm wave lengths, with the optimum effective range between 250 nm to 270 nm. The UV lamp is commonly housed in a protective sleeve of quartz which is similar to a test tube that allows ultraviolet transmission and separates the lamp and wiring from the water surrounding the lamp. The quartz sleeve also helps the UV lamp to maintain its optimal operating temperature of approximately 105° F. Factors that determine a UV system's effectiveness include the intensity of the lamp, the exposure time of the water to the ultra-violet rays and the water transmission rate which is determined by the quality and color of the water.

The typical storage reservoir for water purification units is not usually suitable for effective UV application. In gravity-filled storage reservoirs, there must be a method for controlling the water level within the reservoir, and typically a float valve or switch is used. With a UV bulb inside the reservoir, a float valve or switch would normally act as an obstruction to the UV light rays, and provide a sheltered location for bacterial contamination to grow. A typical size and storage capacity for a point of use reservoir is in the order of approximately 4 to 6 gallons, which is required to compensate for the slow recovery rate of the purification system. Since UV has a limited effective transmission distance, the physical dimensions of a 4 to 6 gallon storage reservoir have not been suitable for effective UV application. A very high intensity UV lamp would be required in such cases and this would heat the chilled water thereby reducing the efficiency and effectiveness of the chilling process. Moreover, UV degrades most plastics, and typically in large reservoirs, floats and switches are constructed of plastic. A typical point of use and bottled water dispenser reservoir is divided into two compartments by an internal baffle that separates the water which has been cooled from the water that is still at room temperature. Two faucets are used, one for dispensing room temperature water and the other for dispensing chilled water. The baffle that separates the cold and room temperature sections blocks UV rays from reaching one of the compartments in such systems.

It has been observed in U.S. Pat. No. 6,139,726 that the known prior art has not solved any of these problems. Although U.S. Pat. No. 6,139,726 is a large improvement over the prior art, there still remains a need to reduce the cycling on and off of the UV bulb as well as the "on" time of the bulb as these factors degrade the life of the bulb. Additionally, since the UV lamp is most effective at an optimal operating temperature, it would be advantageous to have the UV lamp at the optimal operating temperature before admitting water into the tank. Furthermore, if the water supply to the tank fails, there is no system in place to de-activate the UV lamp which would otherwise stay energized heating the water in the tank thereby increasing the power requirements until the bulb burns out. Another need exists for the water in the tank to be treated periodically, even when the water has not been dispensed over a period of time. Finally, as the UV lamp ages, its output decreases. Accordingly, a need exists to increase exposure of the UV lamp to the water as the lamp ages.

SUMMARY OF THE INVENTION

Consequently, it is a primary object of the present invention to provide a water dispensing system for dispensing room temperature and chilled water which has been treated and purified by an ultraviolet source.

It is another object of the present invention to provide a water treatment tank having an ultraviolet energy source therein for effectively decontaminating both room temperature and chilled water which may be contained therein, the tank receiving water from a clean water source such as a distillation/condensation purifier, a point of use filtration source, a reverse osmosis purifier or a bottled water source.

It is a further object of the present invention to provide a water dispensing system including a treatment tank having an ultraviolet (UV) energy source in the form of a lamp for purifying the water therein, the water entering the tank after the UV lamp reaches the optimal operating temperature.

It is a still further object of the present invention to provide a water dispensing system including the treatment tank having an ultraviolet (UV) energy source in the form of a lamp for purifying the water therein, the water being exposed to UV rays while being added to the tank and periodically when not dispensing water from the tank.

It is a yet still further object of the present invention to provide a water dispensing system including a treatment tank having an ultraviolet (UV) energy source in the form of a lamp for purifying the water therein, the lamp being activated for longer periods of time over the life of the lamp.

It is a still further object of the present invention to provide a water dispensing system including a treatment tank having an ultra-violet energy source in the form of a lamp for purifying the water therein, a supply of water being located between a high and a flow limit switch.

Another object of the present invention is to determine whether or not the water supply has failed, and if so, to shut the fill valve and secure the UV lamp.

Accordingly, the present invention provides a water dispensing system wherein the water is treated by ultraviolet rays in a treatment tank to purify the water prior to being dispensed. Water entering into the treatment tank is directed so that it is channeled onto the UV lamp where it flows about the sleeve of the lamp in a thin film greatly increasing the ultraviolet exposure so that a low energy lamp may be effective even under full flow conditions. The treatment tank may have separating baffle which separates room temperature water from chilled water and the ultraviolet lamp extends into both compartments. Moreover, a transparent tube preferably formed from polytetrafluorethylene (e.g.

Teflon) or the like extends through the chilled water compartment below the baffle and communicates the room temperature water with the outlet faucet therefor. The water in the tube is thus radiated by the ultraviolet light emanating from the bulb while the room temperature water is within the tube waiting to be dispensed.

A controller coordinates the operation of the UV lamp with the operation of a solenoid valve so that the lamp may be cycled on and then off to reduce the amount of heat generated within the tank. Furthermore, the controller may allow for the lamp to reach an optimal operating temperature before allowing the solenoid valve to be opened. A low and a high water level limit switch are provided within the tank so that when the water reaches the low level limit, a signal is sent to the controller to initiate filling the tank, and thus opening the valve. When the water level reaches the high water level limit, the controller sends a signal to shut the solenoid valve. If the high level limit is not reached in a predetermined time period, the fill valve may be secured for a first period of time and The process repeated after a second period of time. When the valve is secured between the first and second period of time, the lamp may be turned off. By spacing the high and low level limits a set volume of water apart, the cycling of the fill valve may be reduced which will extend the life of the lamp which treats the water as it enters the tank. Also, after a predetermined period of time of low, or non-use, the UV lamp may be cycled on and off to prevent growth within the tank. Finally, as the UV lamp ages, the period of time the lamp remains on may be increased by the controller.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENT

Figure 1:
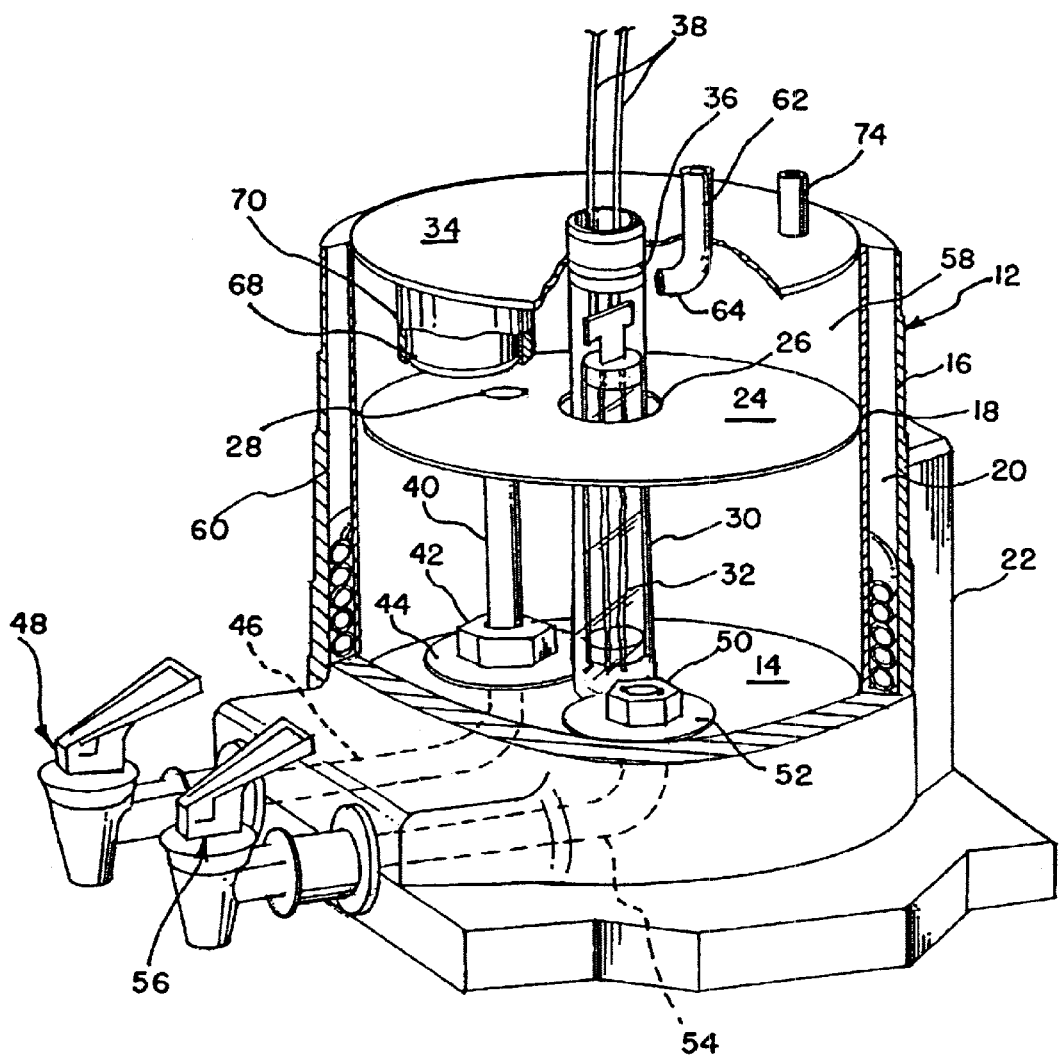
FIG. 1 is a perspective view partly broken away and sectioned of a prior art water dispenser.

Referring now to the drawings, FIG. 1 illustrates a prior art water dispenser. The dispenser includes a housing 12 having a hollow interior including a base 14 and an exterior upstanding wall 16. In at least the lower portion of the housing above the base spaced inwardly from the wall 16 is a second wall 18. Tubing forming cooling coils 20 are received in a coiled condition between the walls 16 and 18, the coils 20 carrying coolant communicating with refrigeration apparatus (not illustrated) mounted within a bulbous portion 22 of the housing 12 preferably externally of the wall 16 for reasons which will hereinafter become clear.

Fastened to the interior wall 18 within the hollow interior of the dispenser is a baffle plate 24, the baffle plate preferably being constructed from stainless steel and having a substantially central opening 26 and a smaller offset opening 28. Extending downwardly through the opening 26 and having portions disposed both above and below the baffle 24 is an outer bulb 30, or tube, in which an ultraviolet lamp 32 is mounted, the bulb being a conventional fused quartz bulb such as a test tube. The bulb 30 extends through an upper lid 34 which covers and closes the hollow interior of the dispenser and the bulb is closed at the upper end by a seal or grommet or other closure member 36 through which electrical conductors 38 pass outwardly to an electrical source (not illustrated).

Also extending through the baffle plate 24 is a transparent tube 40 which preferably is formed from polytetrafluorethylene sold under the trademark TEFLON. The tube 40 permits UV rays to pass therethrough and is not deteriorated by these rays. The tube 40 extends into and through a nut 42 and through a washer 44 beneath the nut into the base where it communicates through tubing 46 connected to the nut 40 with a manually operable faucet valve 48. Another nut 50 positioned on a washer 52 communicates through tubing 54 with another manually operable faucet valve 56.

The baffle plate 24, if utilized, divides the interior of the dispenser 10 into an upper compartment 58 and a lower compartment 60. Secured to the lid 34 and extending into the upper compartment 58 is a water supply tube 62 which may be connected to a source of potable water, which may be filtered water or bottled water. The end of the tube 62 within the dispenser is bent or angled at 64 so that the water 66 exiting the tube 62 is directed onto the bulb 30 about the ultraviolet lamp 32 which provides a thin film laminar flow about the bulb as described in U.S. Pat. No. 6,139,726. This permits use of a low wattage ultra-violet lamp and also insures that all of the water entering the dispenser is treated by the UV light rays.

Mounted within the upper chamber 58 carried by the lid 54 is a float switch 68 mounted within a shield 70. As is the case with the baffle 24, the shield 70 and the nuts 42, 50 and washers 44, 52 are constructed from stainless steel or other similar material so as not to be affected by the ultra-violet rays. A vent tube 74 opening outwardly of the dispenser communicates air to the dispenser so that the water within the dispenser may flow by gravity. The lid 54 may also have a seal instead of, or in addition to, the vent tube 74 that prevents contaminants from getting into the reservoir and forcing air through an air filter that removes airborne contaminants.

As described, all of the elements within the dispenser are typically constructed from quartz, stainless steel or Teflon which do not deteriorate as a result of the ultra-violet rays of the lamp 32. Moreover, the room temperature water within the upper compartment 58 communicates with the manually operable dispensing valve or faucet 48 through the Teflon tube 40 within which this water sits prior to opening of the valve 48. Thus, UV rays act on the water within the tube 40 while the water is in the tube and as the water flows therethrough, thereby insuring that the water remains substantially free of bacteria and effectively pure until the water has exited the dispenser. The water within the lower compartment 60 is chilled by the cooling coils 20 and remains substantially pure until dispensed through the dispensing valve 56. Furthermore, by placing the float switch 68 within a stainless steel shield so that it need not be outside of the dispenser, the water may enter the dispenser directly for fast refill, and by channeling or directing the incoming water directly on to the UV lamp bulb so that it may flow around and contact substantially the entire surface of the bulb in a laminar thin film, the exposure of the water to UV rays is greatly increased even during fast refill and dispensing. This aids in permitting a low wattage UV lamp and reduces the cooling refrigeration requirements for the cooled water.

Figure 2:
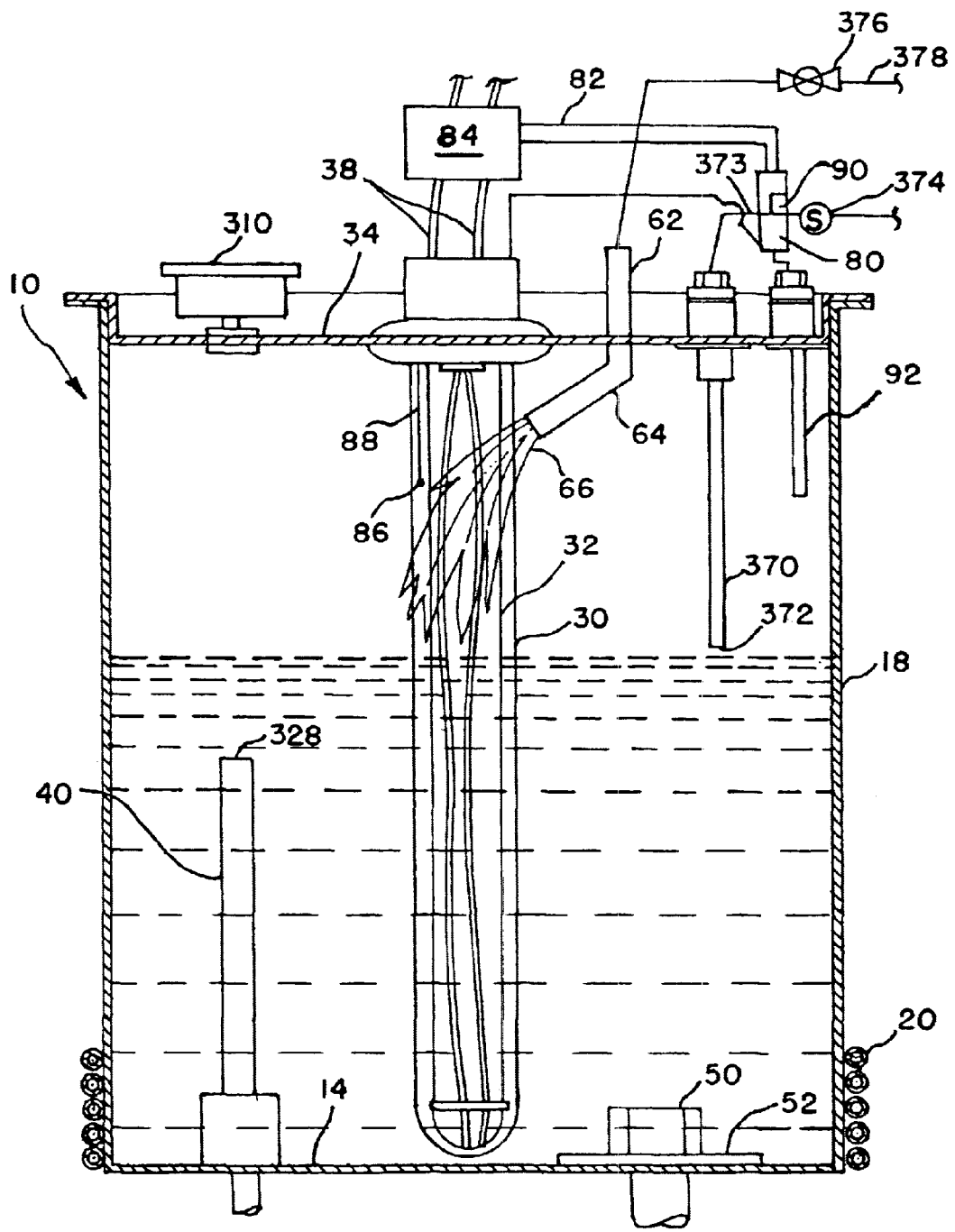
FIG. 2 is an elevational view, partly diagrammatic, of a preferred embodiment of a dispenser constructed in accordance with the principles of the present invention.

FIG. 2 shows the preferred embodiment of the present invention without the baffle plate 24. Of course, the baffle plate 24 could be utilized if desired. Here, the water entering the dispenser 10 again enters through the bent portion 64 of the tube 62 and is directed onto the bulb 30, or tube, disposed about the ultra-violet lamp 32 to provide a thin laminar flow of water, preferably 360 degrees, to treat the incoming water with UV light rays.

The level of the water within the dispenser 10 should be above the upper open end 328 of the tube 40 in order to dispense room temperature water. This may be accomplished by using a first probe 370 fastened to the lid 34 and projecting downwardly into the dispenser tank. The first probe 370 is preferably located along the wall 18 to prevent water from being located behind the probe 370 avoiding treatment by the lamp 32. The first probe 370 is a stainless steel member having an electrical conductivity sensing device 372 at its tip which is within the dispenser 10 which detects when the water is at the level of the tip. The output of the first probe 370 is connected electrically by conductors 373 to a controller 80 connected to a normally closed solenoid 374 of a solenoid valve 376 which is mounted in the water line 378 between a source of water and the tube 62. When the water level within the dispenser tank falls below the tip of the first probe 370, a signal is received by the controller 80.

The controller 80 is illustrated as an electronic component having at least a limited processor configured to receive inputs from at least one probe, and preferably a timer 90, and provide output signals to the valve solenoid 374 and the switch 84. This results in a signal being sent through the conductor 82 to switch 84 to activate the UV Lamp 32, since the lamp 32 is normally not activated as the switch 84 is normally in the off position.

After being activated, the lamp 32 reaches a desired operating temperature. Whether the lamp has reached the desired operating temperature may be evaluated by the controller 80 using a temperature measuring device 86 located within the tube 30 and connected by conductor 88 to the controller 80, or by the passing of a predetermined amount of time from the activation of the lamp 32 as measured by a timer 90 which may be a part of the controller 80. Of course, the temperature measuring device 86 is illustrated above the anticipated high water level to avoid obscuring portions of the tank from treatment. Upon reaching the desired operating temperature, the controller 80 sends a signal to the solenoid 374 to open valve 376 to begin filling the dispenser.

When the water reaches the level of the first probe 370, the controller 80 will be aware that the minimum water level has been restored in the dispenser 10. However, in order to minimize the cycling of the UV lamp 32 on and off, a second probe 92 may be fastened to the lid 34 and projects downwardly into the dispenser tank. The second probe 92 is preferably similarly constructed to the first probe 370, except that the probe tip does not extend as deeply into the tank as the first probe 370. The second probe 92 may also be located against the wall 18 to avoid creating areas which are not treated by the lamp 32. Alternatively, instead of relying on the second probe 92 or possibly enen utilizing a second probe 92, the passing of a predetermined time from point of contact with the first probe 370 may be utilized to shut off the solenoid 374 and close the valve 376. A restriction valve may be utilized on the water supply to ensure a maximum flow rate into the tank. The flow restrictor can prevent incoming flow from overfilling the reservoir.

When the water reaches the desired level such as the level of the second probe 92, if utilized, a signal is sent to the controller 80. The controller then sends a signal to the solenoid 374 to close the valve 376. The switch 84 may then be turned "off" to deactivate lamp 32 after a first predetermined time. The distance between the tip of the first and second probes 370, 92 is anticipated to hold a sufficient volume of water to reduce the cycling of the UV lamp 32 on and off. In the preferred embodiment, this volume would be about sixteen ounces, or about four cups of about four ounces of water. It is estimated that the number of lamp starts could be reduced up to about 80% thereby reducing the energy consumption of the dispenser and the life of the lamp 32.

If one of the first or second probes 370, 92 fails to detect water upon the opening of the valve 376 after a first fill time, a signal will be sent by the controller 80 to shut the valve 376 and deactivate the lamp 32. This function serves as a "no water alarm" to prevent burn out of the lamp 32 and wasted energy. The controller may then wait a first wait time and reactivate the solenoid 374 to open valve 376 after activating lamp 32. A preset number of attempts may be made to fill the tank until the system secures itself, or the controller 80 may continue to fill through this process until water is once again is restored within the dispenser to the probes 370, 92.

If the dispenser is not utilized for a period of time, with a normally "off" lamp, bacteria could begin to grow. In some environments, bacteria has been found to begin to grow and begin to attach to reservoir walls in as little as 24 hours. Once bacteria forms a slime coat, it has been found to be relatively difficult to remove, even with UV treatment. Accordingly, if a dispenser is not utilized, such as at night, on the weekends and during vacation periods, it is anticipated that the controller 80 will track the last time the lamp 32 was operated. If the time since last use exceeds an idle time, then the UV lamp 32 will be cycled "on" by the controller 80 for a run time.

An additional feature of the dispenser 10 includes the increase of the duration of the run time over the life of a lamp 32. As the lamp 32 ages, the effective output is believed to decrease due to a number of factors. Lamps 32 are typically sized for their end of life (EOL) output level. To increase the UV treatment effectiveness with systems that operate lamps 32 on use with a set time interval, such as a run time of five minutes, the controller 80 starts a new lamp with a first run time, such as five minutes, when water is admitted to the reservoir. As the lamp ages, the controller 80 increases the lamp run time to a second run time, such as 7.5 minutes at the half life of the lamp 32. When the lamp approaches the EOL, the controller may increase the lamp run time to a third run time, such as ten minutes to compensate for UV intensity losses over the life of the lamp.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

What is claimed is:

1. A water dispenser including a housing having a water treatment tank, a water inlet selectively feeding water into an upper section of said tank, cooling coils acting to chill water in a lower section of said tank, an ultra-violet lamp disposed in both the upper and lower sections of the tank for transmitting ultra-violet light rays to water in both upper and lower sections to eliminate bacterial growth in both upper and lower sections, a first faucet communicating with said lower section for dispensing chilled water selectively, a second faucet, and a supply conduit communicating water in said upper section with said second faucet for dispensing water which has not been chilled selectively, and a controller maintaining the ultra-violet lamp normally off and activating the ultra-violet lamp to operate at a desired operating temperature before allowing water to enter the tank through the water inlet.

2. The water dispenser as recited in claim 1 wherein once the lamp is at the desired operating temperature, the lamp remains activated for a run time and then de-activated by the controller.

3. The water dispenser as recited in claim 2 wherein the run time is a first run time of about five minutes.

4. The water dispenser as recited in claim 2 wherein the run time is lengthened after a first period to a second run time.

5. The water dispenser of claim 4 wherein the first period is about the half life of the lamp.

6. The water dispenser of claim 1 further comprising a first or a single probe water level sensor, said first water level sensor sending a signal to the controller upon sensing a low water level condition in the tank, said controller receiving the signal from the first water level sensor and sending output signals to a solenoid valve to open after receiving the low water level signal.

7. The water dispenser of claim 6 wherein the solenoid valve closes after a predetermined time.

8. The water dispenser of claim 6 further comprising a second water level sensor, said second water level sensor sending a signal to the controller upon sensing a high water level condition in the tank, wherein the low water level condition in the tank corresponds to a first volume of water in the tank and the high water level condition in the tank corresponds to a second volume of water in the tank, said second volume of water greater than the first volume of water by a predetermined volume and said solenoid valve closes after receipt of the high water signal.

9. The water dispenser of claim 1 wherein after a first non-use period, the controller sends a signal to activate the lamp for a predetermined time.

10. The water dispenser of claim 9 wherein the first non-use period is between about three and about six hours.

11. The water dispenser of claim 10 wherein the controller utilizes a timer to determine whether a refill time exceeds a predetermined expected fill time, and if said refill time exceeds the predetermined expected fill time, securing the water inlet and deactivating the lamp.

12. The water dispenser of claim 11 wherein after securing the water inlet and de-activating the lamp, the lamp is activated a first wait time and the water inlet is re-opened.

13. The water dispenser of claim 1 further comprising a first probe, said first probe communicating a low water level signal to said controller, said controller then sending a signal to activate the lamp and then sending a signal to direct water to enter the tank from the water inlet.

14. The water dispenser of claim 13 further comprising a second probe, said second probe communicating a high water level signal to said controller, said controller then sending a signal to secure flow of water from the water inlet and then turn off the lamp.

15. The water dispenser of claim 14 wherein the lamp is turned off after completion of a run time.

16. The water dispenser of claim 1 further comprising a baffle between the upper and lower tank sections.

17. A water dispenser including a housing having a water treatment tank, a water inlet selectively feeding water into an upper section of said tank, cooling coils acting to chill water in a lower section of said tank, an ultra-violet lamp disposed in both the upper and lower sections of the tank for transmitting ultra-violet light rays to water in both upper and lower sections to eliminate bacterial growth in both upper and lower sections, a first faucet communicating with said lower section for dispensing chilled water selectively, a second faucet, and a supply conduit communicating water in said upper section with said second faucet for dispensing water which has not been chilled selectively, a first probe, and a controller, said first probe communicating a low water level signal to said controller to activate the lamp and then direct water to enter the tank from the water inlet, said controller utilizing a timer to determine whether a refill time exceeds a predetermined expected refill time, and if said refill time exceeds the predetermined expected refill time, said controller sending a signal to secure the water inlet.

18. The water dispenser of claim 17 wherein said controller sends a signal to activate the lamp prior to directing the water to enter the tank from the water inlet.

19. A water dispenser including a housing having a water treatment tank, a water inlet selectively feeding water into an upper section of said tank, cooling coils acting to chill water in a lower section of said tank, an ultra-violet lamp disposed in both the upper and lower sections of the tank for transmitting ultra-violet light rays to water in both upper and lower sections to eliminate bacterial growth in both upper and lower sections, a first faucet communicating with said lower section for dispensing chilled water selectively, a second faucet, and a supply conduit communicating water in said upper section with said second faucet for dispensing water which has not been chilled selectively, and a controller coupled to a timer adapted to evaluate the time since a most recent period of activation of the ultra-violet lamp, said controller receiving a signal when the ultra-violet lamp is activated independent of the timer, and said controller maintaining the ultra-violet lamp normally off and activating the ultra-violet lamp for a run time after a predetermined idle time.

20. The water dispenser as recited in claim 19 wherein said idle time is less than about six hours.

21. The water dispenser of claim 19 wherein the controller is connected to a solenoid controlled valve in communication with the water inlet, and said controller activates the lamp prior to opening the water inlet valve.

22. A water dispenser including a housing having a water treatment tank, a water inlet selectively feeding water into an upper section of said tank, cooling coils acting to chill water in a lower section of said tank, an ultra-violet lamp disposed in both the upper and lower sections of the tank for transmitting ultra-violet light rays to water in both upper and lower sections to eliminate bacterial growth in both upper and lower sections, a first faucet communicating with said lower section for dispensing chilled water selectively, a second faucet, and a supply conduit communicating water in said upper section with said second faucet for dispensing water which has not been chilled selectively, and a controller coupled to a timer adapted to evaluate the time since a most recent period of activation of the ultra-violet lamp, said controller maintaining the ultra-violet lamp normally off and activating the ultra-violet lamp for a run time after a predetermined idle time; said controller is connected to a solenoid controlled valve in communication with the water inlet valve and said controller activates the lamp prior to opening the water inlet valve, and said lamp is allowed to achieve a desired operating temperature before the controller opens the water inlet valve.

* * * * *